June 21, 1927.
A. L. LANGENFELD
1,633,259
PROPULSION LINK FOR ENDLESS TRACTION BELTS
Filed March 5, 1927   2 Sheets-Sheet 1
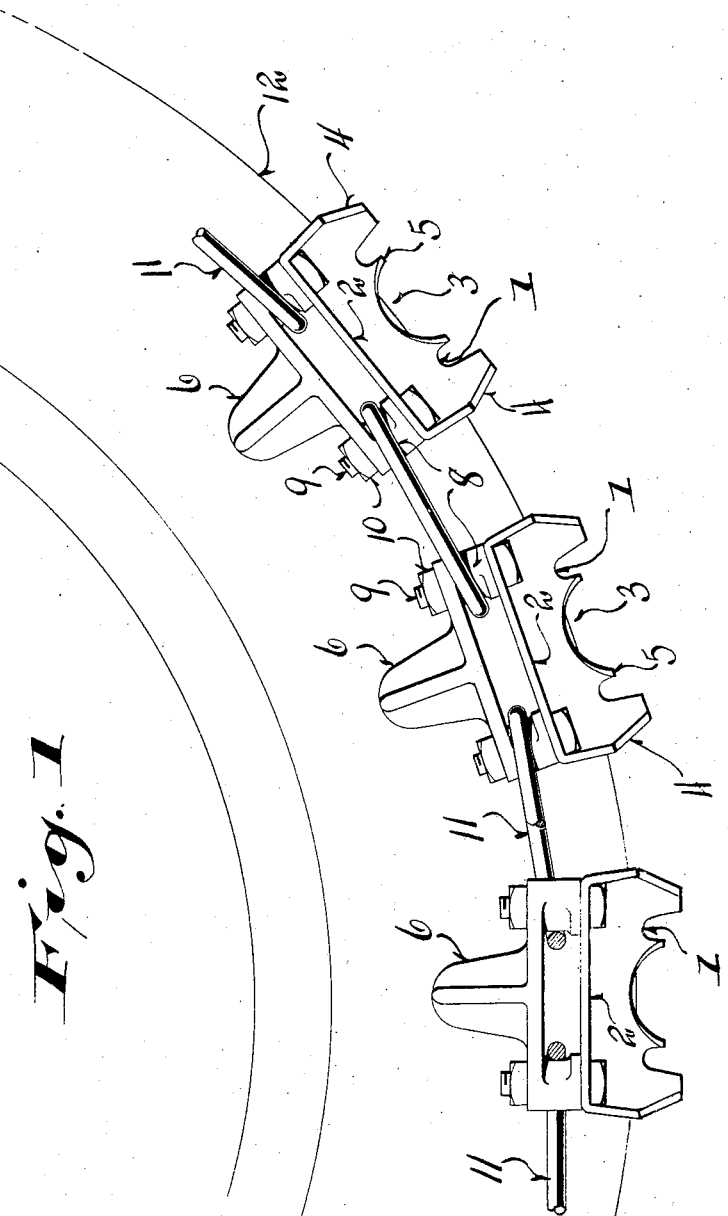

June 21, 1927.  
A. L. LANGENFELD  
1,633,259  
PROPULSION LINK FOR ENDLESS TRACTION BELTS  
Filed March 5, 1927  2 Sheets-Sheet 2
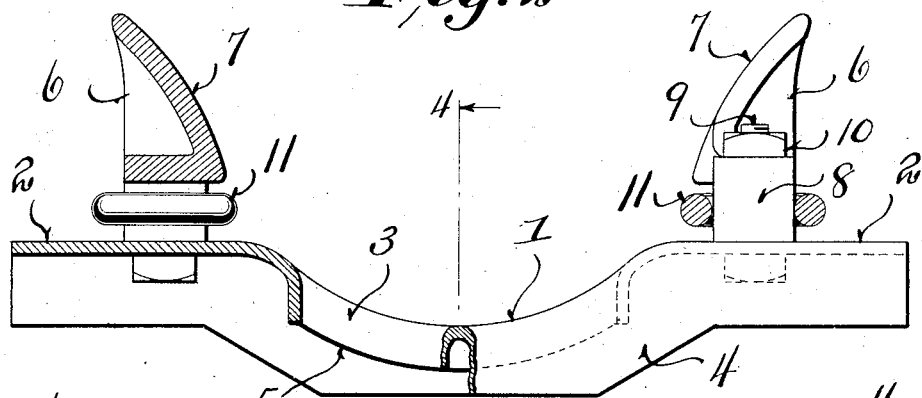
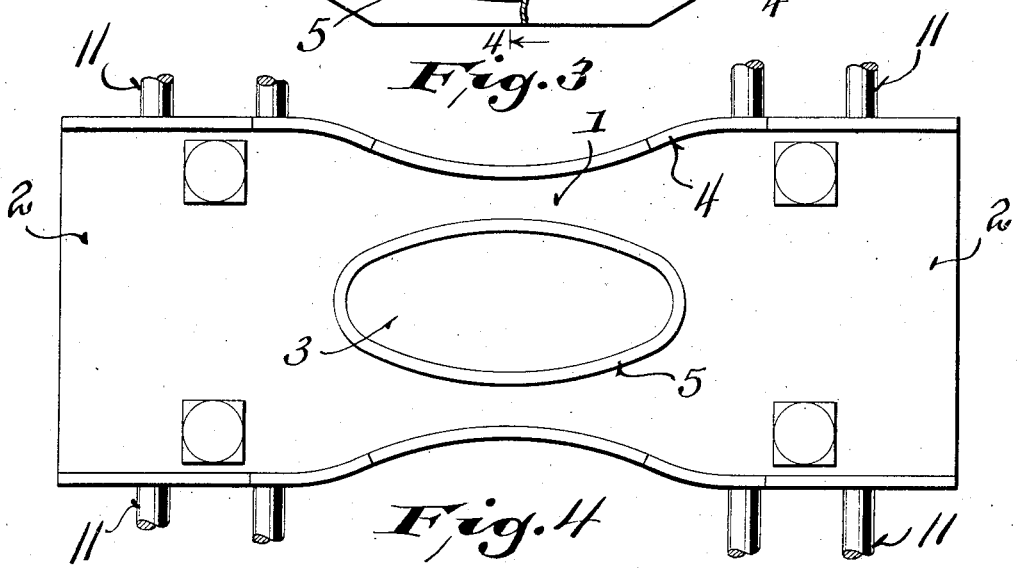
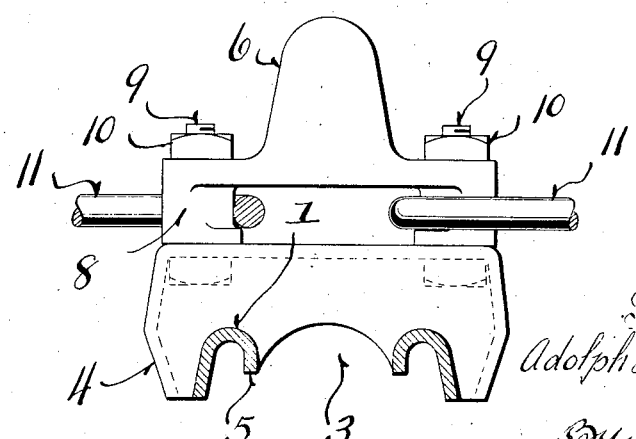
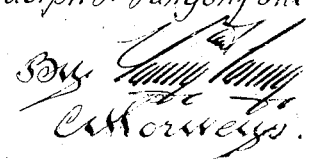
Inventor:  
Adolph L. Langenfeld Patented June 21, 1927.

1,633,259

UNITED STATES PATENT OFFICE.

ADOLPH L. LANGENFELD, OF NEW HOLSTEIN, WISCONSIN.

PROPULSION LINK FOR ENDLESS TRACTION BELTS.

Application filed March 5, 1927. Serial No. 173,104.

This invention relates to propulsion links for endless traction belts.

Objects of this invention are to provide a novel form of traction belt and tread piece therefor, which is so constructed that it will secure a very firm grip on the roadway, particularly where a loose footing is ordinarily secured, as, for instance, in snow and in sand, and also which is so constructed that packing of the snow or other material between the tread pieces and the wheels is prevented as means are provided for automatically discharging any snow that may be picked up.

Further objects are to provide a novel form of tread piece in which the maximum of strength combined with extreme lightness is obtained by the same construction which secures the additional secure grip upon the roadway.

An embodiment of the invention is shown in the accompanying drawings in which:

Figure 1 is a fragmentary side view of a portion of a wheel of an automobile provided with the traction belt;

Figure 2 is a view partly in section of the tread piece;

Figure 3 is a view from the underside of the tread piece;

Figure 4 is a sectional view on the line 4—4 of Figure 2.

Referring to the drawings, it will be seen that the tread piece comprises a body portion provided with a downwardly and centrally arched intermediate part 1 and with outwardly extending end portions 2. The intermediate portion is provided with a centrally located aperture 3, preferably of approximately elliptical contour. It is to be noted particularly that the side edges of the body portion of the tread piece are provided with downwardly extending flanges 4, and similarly the tread piece is provided with a downwardly extending flange 5 at the margin of the centrally located aperture 3. These flanges, as is apparent from Figures 2, 3, and 4, form a plurality of gripping members located transversely of the wheel, as is apparent from Figure 1, and insure a very firm grip.

Each of these tread pieces may, if desired, be formed from sheet metal by suitable stamping operations, and thus extreme cheapness may be obtained, together with great strength due to the flange construction, and also lightness.

The outwardly projecting ends of the tread piece are each provided with guide lugs 6 which have their inner faces curved, as indicated at 7, so that the wheel may be accurately guided by the downwardly arched portion 1, and the curved side or inner faces of the guide lugs. Each guide lug, as shown most clearly in Figure 4, is provided with an integral link anchor post 8, located at opposite sides thereof and through which attaching bolts 9 pass. These attaching bolts preferably have their heads located on the underside of the tread pieces and the nuts 10 therefor are located on the upper side of the guide lug. These anchor posts have the links 11 looped about them and thus successive tread pieces are securely joined.

It is to be noted that the device is so constructed that a wheel equipped with a tire, as shown in Figure 1 and indicated by the reference character 12, may be readily received by the device without danger of injuring any portion of the wheel, as the tire is guided by the rounded contacting surfaces of the tread piece and guide lugs. Further, this invention provides a propulsion traction belt which secures a very firm grip upon the roadway due to the plurality of downwardly extending flanges which bite into the insecure footing upon which the device may travel.

Further, due to the flanged construction, a second or additional feature results, namely, the extreme strength of the traction tread pieces as they are braced by their downwardly extending flanges.

In operating a vehicle over a snow covered roadway or muddy or sandy roadway, these traction tread pieces serve the additional function of providing for the automatic clearing of the tread pieces from any accumulation of material, such, for instance, as snow. For example, as the tire enters successive tread pieces, it dislodges the snow therefrom through the central aperture and, consequently, packing of the snow in the tread piece can not occur.

Although the invention has been described in considerable detail, such description is intended as illustrative rather than limiting as the invention may be variously embodied and as the scope of such invention is to be determined as claimed.

I claim:

1. In a traction belt structure, the combination of a plurality of tread pieces each having a downwardly arched body portion provided with a central opening and having a wheel-engaging guide lug located at opposite sides of the tread piece, each guide lug having anchor posts contacting with the body of the tread piece, and links joining successive tread pieces and looped around the posts of the guide lugs.

2. A traction belt tread piece comprising a body portion having a downwardly arched, centrally apertured intermediate portion and having outwardly projecting side portions, a wheel engaging guide lug carried by each of said side portions, said guide lugs each having integral link-receiving anchor posts at opposite sides of such guide lug, and bolts passing through the tread pieces and the anchor lugs.

In testimony that I claim the foregoing I have hereunto set my hand at Milwaukee, in the county of Milwaukee and State of Wisconsin.

ADOLPH L. LANGENFELD.